United States Patent Office 3,660,360
Patented May 2, 1972

3,660,360
WATER- AND OIL REPELLENCY AGENTS
Dilip K. Ray-Chaudhuri and Carmine P. Iovine, Somerset, N.J., assignors to National Starch and Chemical Corporation, New York, N.Y.
No Drawing. Filed June 24, 1970, Ser. No. 49,537
Int. Cl. C08f 15/38, 29/38, 37/00
U.S. Cl. 260—78.5 E     12 Claims

ABSTRACT OF THE DISCLOSURE

Fluoroalkyl - alkoxyalkyl acrylates and methacrylates comprising the reaction product of a perfluoroalkoxyalkyl alkanol and an acrylic or methacrylic acid reagent. The resulting monomers may, thereafter be homo- or copolymerized with a wide variety of conventional ethylenically unsaturated, i.e. vinyl, monomers, said polymeric materials imparting both water and oil repellency to a wide variety of substrates.

SUMMARY OF THE INVENTION

It is the object of this invention to provide a novel class of fluoroalkyl-alkoxyalkyl acrylate and methacrylate esters, said esters being capable of undergoing vinyl type polymerizations either alone or in the presence of other vinyl type monomers. A further object of this invention is to utilize these compositions to treat substrates exhibiting either fibrous, porous or continuous surfaces and thereby provide said substrates with a high degree of water, oil and soil repellency. Various other objects and advantages of this invention will become apparent to the practitioner from the following description thereof.

Thus, the novel monomeric compositions of this invention comprise the fluoroalkyl-alkoxyalkyl acrylate and methacrylate esters corresponding to the following formula:

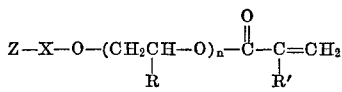

wherein
Z is a radical containing from 3 to 20 carbon atoms inclusive and is selected from the group consisting of straight and branched chain perfluoro alkyl radicals; perfluoro cyclo aliphatic radicals; and, straight and branched chain perfluoro alkyl and perfluoro cyclo aliphatic radicals wherein the perfluoro group is substituted with at least one atom selected from the group consisting of hydrogen, chlorine, bromine and iodine atoms;
X is a radical selected from the group consisting of straight and branched chain alkenylene and alkylene radicals containing from 1 to 20 carbon atoms;
R is selected from the group consisting of hydrogen, alkyl radicals containing from 1 to 20 carbon atoms, aromatic radicals, and cycloaliphatic radicals;
R' is selected from the group consisting of hydrogen and methyl radicals; and,
n is an integer having a value of from 1 to 10 inclusive.

As previously noted, materials which have been treated with the novel fluoro compositions of this invention exhibit water, oil and soil repellency. Among the primary avantages derived from the use of these additives are included:
(1) the ability to use a single additive in order to acquire a large number of desired properties;
(2) the applicability of these additives to a wide variety of substrates, e.g. textiles, paper, etc.;
(3) the prolonged retention of the properties imparted by these novel additives despite repeated wet laundering and/or dry cleaning;
(4) the ease with which substrates may be treated with these additives; and,
(5) the soft hand and drape which is also imparted to the thus treated fabrics, etc.

DESCRIPTION OF THE PREFERRED EMBODIMENTS

In brief, the procedure for preparing the fluoroalkyl-alkoxyalkyl acrylate and methacrylate esters of this invention comprises reacting (1) a perfluoroalkoxyalkyl alkanol with (2) an acrylic or methacrylic acid reagent.

The perfluoroalkoxyalkyl alkanol applicable for use in the process of this invention correspond to the formula:

$$Z-X-O-(CH_2CH-O)_nH$$
$$\phantom{Z-X-O-(CH_2C}|$$
$$\phantom{Z-X-O-(CH_2CH-O)_n}R$$

wherein Z, X, R and n are as previously identified.

Thus, among the applicable perfluoroalkoxyalkyl alkanols are included:

ethylene glycol, mono-(α,α-dihydroperfluorooctyl) ether, i.e. $C_7F_{15}CH_2OCH_2CH_2OH$;
diethylene glycol, mono-(α,α-dihydroperfluorooctyl) ether, i.e. $C_7F_{15}CH_2O(CH_2CH_2O)_2H$;
ethylene glycol, mono-(1,1,7-trihydroperfluoro heptyl) ether, i.e. $H(CF_2CF_2)_3CH_2OCH_2CH_2OH$;
ethylene glycol, mono-(α,α-dihydroperfluorobutyl) ether, i.e., $C_3F_7CH_2OCH_2CH_2OH$;
diethylene glycol, mono-(α,α-dihydroperfluorobutyl) ether, i.e. $C_3F_7CH_2O(CH_2CH_2O)_2H$;
triethylene glycol, mono-(α,α-dihydroperfluorobutyl) ether, i.e. $C_3F_7CH_2O(CH_2CH_2O)_3H$;
1-methyl-ethylene glycol, mono-(α,α-dihydroperfluorooctyl) ether, i.e.

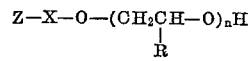

ethylene glycol, mono-([11-perfluoroheptyl]undecyl) ether, i.e. $C_7F_{15}(CH_2)_{11}OCH_2CH_2OH$;
1-phenyl-ethylene glycol, mono-(α,α-dihydroperfluorooctyl) ether, i.e.

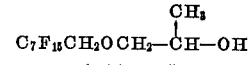

1-ethyl-ethylene glycol, mono-(α,α-dihydroperfluorooctyl) ether, i.e.

decaethylene glycol, mono-[(5-perfluorobutyl)-n-pentyl] ether, i.e. $C_4F_9(CH_2)_5O(CH_2-CH_2O)_{10}H$;
diethylene glycol, mono-[(12-perfluorododecyl)-n-dodecyl]ether, i.e. $C_{12}F_{25}(CH_2)_{12}O(CH_2-CH_2O)_2H$;
octaethylene glycol, mono-(α,α-dihydroperfluorooctyl) ether, i.e. $C_7F_{15}CH_2O(CH_2-CH_2O)_8H$;
propylene glycol, mono-[(10-perfluoropentyl)-10-undecene] ether, i.e.

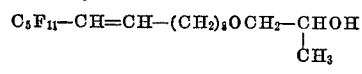

A typical procedure for preparing the perfluoroalkoxyalkyl alkanols comprises the reaction of a prefluoro alcohol with an alkylene oxide in the presence of an acidic or basic catalyst in a pressure vessel at a temperature of 60–120° C. for a period of about 1–24 hours. Among the applicable alkylene oxides are included: ethylene oxide, propylene oxide, 1,2-butylene oxide, styrene oxide, 1,2-dodecene oxide and 1,2-octadecene oxide.

This reaction procedure, which is preferred for purposes of this invention, proceeds according to the following reaction mechanism:

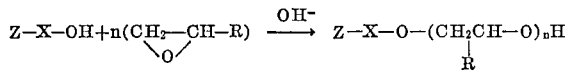

The perfluoroalkoxyalkyl alkanols can also be prepared by means of a base induced condensation reaction of the perfluoro alcohol with an omega-halo alcohol conducted either at atmospheric or super-atmospheric pressures. The reaction mechanism of this procedure is as follows:

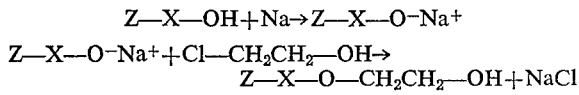

In either instance, the usually water insoluble perfluoroalkyl ether alcohols are isolated by means of conventional extraction and distillation techniques.

The procedures which may be used for preparing the acrylate and methacrylate esters of the perfluoroalkoxyalkyl alkanol intermediates are well known to those skilled in the art. Included among such procedures are:

(1) Direct esterification wherein glacial acrylic or methacrylic acid is reacted with the alkanol intermediate, the latter esterification being effected by refluxing the reagents in the presence of an acidic catalyst, such as benzene sulfonic acid, and removing the water formed during the course of the reaction by means of an azeotropic distillation technique;

(2) The reaction, at temperatures of from about 10° C. to 75° C., of perfluoroalkyl ether alkanol intermediate with acrylyl or methacrylyl chloride and the simultaneous removal of the hydrogen chloride produced during the course of the reaction; and (3) An alcoholysis technique whereby a low molecular weight acrylate or methacrylate ester such, for example, as methyl acrylate ethyl acrylate and methyl methacrylate is reacted with the perfluoroalkyl ether alkanol intermediate in either an acidic or alkaline medium at temperatures of from about 50° C. to 150° C. Regardless of the procedure utilized, the resulting acrylate and methacrylate esters may be purified by conventional means thereby resulting in products which are usually low melting solids or viscous liquids, which are highly soluble in chlorinated solvents, alcohols and acetone and which have some utility as water and oil repellency agents. In view of the variety of methods which may be used to prepare the acrylate and methacrylate esters, the term "acrylic and methacrylic acid reagent," for purposes of this invention, is meant to include acrylic acid, methacrylic acid and any derivatives thereof which may be utilized to convert the alkanol intermediate to its acrylate or methacrylate equivalent.

With respect to proportions, the determination of the precise concentration of the primary reactants in relation to one another, as based on the stoichiometric equivalencies of the various reactions, is left to the discretion of the practitioner. However, typical proportions for the preparation of the intermediates and the subsequent acrylates and methacrylates include the reaction of one mole of the perfluoroalcohol with approximately 1–10 mole of the alkylene oxide and, thereafter, the reaction of the intermediate product with approximately one mole of the acrylic or methacrylic acid reagent.

In utilizing the fluoroalkyl-alkoxyalkyl acrylates and methacrylates in the preparation of homo- and copolymers, there may be employed one of the usual vinyl polymerization methods which are well known to those skilled in the art and which is particularly suited for the homo- and copolymer whose preparation is desired. Thus, such polymers may be prepared by means of free radical initiated processes utilizing bulk, suspension, solution or emulsion polymerization techniques; or, they may be prepared by ionic catalysis or by means of stereospecific catalysts such as those of the type developed by Ziegler.

The comonomers which may be utilized together with the above described acrylate and methacrylate monomers for the preparation of the copolymers of this invention can be any ethylenically unsaturated monomer such, for example as styrene; alpha-methyl styrene; the acrylic, methacrylic and crotonic acid esters of aliphatic alcohols such as methyl, ethyl, propyl, butyl, isobutyl, amyl, hexyl, 2-ethyl hexyl, octyl, lauryl and stearyl alcohols; acrylic acid; methacrylic acid; crotonic acid; isoprene; acrylamide; methacrylamide; N-methylol acrylamide; acrylonitrile; methacrylonitrile; butadiene; vinyl propionate; dibutyl fumarate; dibutyl maleate; diallyl phthalate; vinylidene chloride; vinyl chloride; vinyl fluoride; vinyl acetate; ethylene; and, propylene, etc. Any of these monomers may be used either alone or in combination with one another together with one or more of the acrylate and methacrylate monomers of this invention.

The homo- and copolymers of this invention, whether prepared by means of bulk, suspension, solution or emulsion polymerization techniques or by any other means, may all be effectively utilized to treat a virtually unlimited variety of solid materials regardless of whether they exhibit fibrous, porous or continuous surfaces. Among such materials are included: Textiles derived from wool, cotton, polyester, nylon, polyacrylonitrile and other synthetic fibers; glass; paper; wood; leather; fur; asbestos; brick; concrete; metal; ceramics; plastics as well as painted and plastered surfaces. Thus, for purposes of convenience, when reference is hereinafter made to "applying to" or to "treating" or to "the treatment of" such substrates, these terms are meant to encompass both the coating and/or impregnation of porous substrates as well as the coating of impervious substrates.

These solid materials may be treated by means of any effective technique whose use is desired by the practitioner. Thus, textiles are typically treated by a "padding" technique wherein the textile is passed through an organic solvent solution of a novel fluorochemical product of this invention, squeezed through a nip and then briefly heated to evaporate the solvent. Typical organic solvents include isopropanol, acetone, methyl ethyl ketone, etc. The treated textile is subsequently cured by being heated at a temperature of from about 60° C. to 180° C. for a period of about 5 to 10 minutes, thereby developing total water and oil repellency. A Lewis acid catalyst, such as aluminum chloride, may be optionally present in order to enhance the latter curing operation. In addition, such surface coating techniques as spraying and brushing may also be effectively utilized in order to deposit a film of the repellent on the surface of the substrate. The amount of additive which is required to provide adequate water, oil and soil repellency will vary according to the particular fluorochemical product being used, the selected substrate and the specific end-use application of the resulting treated product, although the presence of as little as about 0.1% of the additive, based on the weight of the substrate, will ordinarily provide adequately improved water and oil repellency. On the other hand, it may be noted that there is no particular advantage to be derived from utilizing more than about 6% of repellent, based on the weight of the substrate, since the increased expense thus incurred far outweighs the increase in repellency which may be obtained thereby.

In addition, it is to be noted that the novel polymers of this invention may be applied to the desired substrates while they are in the form of an aqueous emulsion, it being merely necessary to polymerize them in aqueous form, or otherwise, to select an appropriate emulsifier for the polymeric system.

It should be noted that the presence of ether linkages in these monomers and polymers does not hinder oil repellency. Furthermore, these ether linkages render hydrophilic the typically hydrophobic fluorocarbon coating so that it may be "wet" by water. This wetability of the coating facilitates soil release of ground-in stains during wet laundering.

The actual application to substrates of the novel compositions of this invention may be accomplished by any means capable of effectively depositing a small concentration of the repellent, such as by a coating or spray technique.

The following examples will further illustrate the embodiment of this invention. In these examples, all parts given are by weight unless otherwise noted.

EXAMPLE I

This example illustrates the preparation of a fluoroalkylalkoxyalkyl acrylate monomer typical of the novel products of this invention.

A monel reactor was charged with 205 parts α,α-dihydroperfluorooctanol and 6 parts powdered KOH. The contents of the reactor were cooled to −40° C. whereupon 27.1 parts ethylene oxide liquid was added thereto. The reactor was sealed to the atmosphere and heated at 90° C. for 18 hours.

After completion of the reaction period, the contents of the reactor were dissolved in diethyl ether and washed with diluted acid and then water until the water washes were neutral to litmus. The ether solution was dried over sodium sulfate and the ether removed by distillation. Fractionation of the resulting alkylate indicated an 82.5% yield consisting of

57% $C_7F_{15}CH_2OCH_2CH_2OH$ and

43% $C_7F_{15}CH_2O(CH_2CH_2O)_2H$

Thereafter, 63.6 parts of the above prepared ethylene glycol, mono-(α,α-dihydroperfluorooctyl) ether, 18 parts of glacial acrylic acid, 75 parts toluene, 0.8 part benzene sulfonic acid and 0.4 part monomethyl ether of hydroquinone were charged into a 3-neck round bottom flask fitted with thermometer, stirrer, azeotropic distillation receiver and condenser. The mixture was agitated and heated at its reflux temperature, i.e. approximately 120° C., 8 hours when 2.8 parts of water had been collected. The toluene solution was washed with water and dilute aqueous sodium hydroxide solution until the wash liquor was neutral to litmus. After drying over sodium sulfate, the toluene solution was fractionated thereby providing a 78% yield of the ethylene glycol, mono-(α,α-dihydroperfluorooctyl) ether acrylate. (B.P. 94–100° C./0.4 mm. Hg).

The above procedure was then repeated, under identical conditions, with the exception that methacrylic acid was substituted for the acrylic acid utilized therein in order to prepare a comparable methacrylate ester.

EXAMPLE II

This example illustrates the preparation of the novel polymers of this invention by means of an emulsion polymerization technique.

A reaction vessel fitted with a thermometer, stirrer, reflux condenser and nitrogen inlet, was charged with 0.36 part dimethyl stearylamine, 0.06 part glacial acetic acid, 31.8 parts water, 12.3 parts acetone, 0.02 part N-methylolacrylamide, 0.3 part N-butyl acrylate, 10 parts ethylene glycol, mono-(α,α-dihydroperfluorooctyl) ether acrylate, prepared in Example I hereinabove, and 0.05 part α,α′-azobisisobutyramidine dihydrochloride. The mixture was purged for 15 minutes at room temperature with nitrogen, and then the temperature was raised to reflux (60° C.). This temperature was maintained over a 5 hour period during which time, polymerization was evidenced by an increase in turbidity. After the polymerization was complete, the latex was filtered through cheese cloth. A 94% monomer conversion factor was indicated.

EXAMPLE III

This example illustrates the preparation of the novel polymers of this invention by means of a solution polymerization technique.

A reaction vessel fitted with a nitrogen inlet, thermometer, reflux condenser and stirrer was charged with 10 parts ethylene glycol, mono-(α,α-dihydroperfluorooctyl) ether acrylate (described in Example I, hereinabove), 10.3 parts acetone and 0.03 part α,α′-azobisisobutyronitrile. The solution was purged for 15 minutes at room temperature and then brought to reflux (60° C.). Upon initiation of the polymerization reaction, as evidenced by a viscosity increase, 0.58 part of a 40%, by weight, N-methylolacrylamide solution in isopropanol was added over a 30 minute period. After three hours at reflux, the reaction was diluted to 30% by the addition of acetone and 0.015 part of additional catalyst was added with continued heating for an additional three hours. An 87.5% monomer conversion factor was indicated.

This solution polymerization technique is suitable for preparing any of the reaction products in accordance with the invention. Thus, following the procedure of the Example III, the following ethylenically unsaturated monomers may be used: Styrene, alipha-methyl styrene, the acrylic, methacrylic and crotonic esters of aliphatic alcohols, acrylic acid, methacrylic acid, crotonic acid, isoprene, acrylamide, methacrylamide, acrylonitrile, methacrylonitrile, butadiene, vinyl propionate, dibutyl fumarate, dibutyl maleate, diallyl phthalate, vinylidene chloride, vinyl chloride, vinyl fluoride, vinyl acetate, ethylene and propylene.

EXAMPLE IV

This example illustrates the wide variety of reagents and reaction conditions which can be efficiently utilized to prepare the novel products of this invention.

A number of different fluoro acrylate copolymers were prepared, according to the general procedure set forth in Examples I and III, utilizing a variety of reagents at different concentration levels and under varying reaction conditions. These variables are presented in the following tables wherein "Table I" refers to the preparation of the perfluoroalkoxyalkyl alkanol intermediates, "Table II" refers to the preparation of the corresponding acrylate and methacrylate esters and "Table III" refers to the homo- or copolymerization of the resulting ester monomers.

TABLE I

| Intermediate number | Parts | | | | | | |
|---|---|---|---|---|---|---|---|
| | 2 | 3 | 4 | 5 | 6 | 7 | 8 |
| 1,1,7-trihydroperfluoroheptanol | 50 | | | | | | |
| α,α-Dihydroperfluorooctanol | | 40 | | 40 | 40 | | 50 |
| α,α-Dihydroperfluorobutanol | | | 35 | | | | |
| 11-perfluoro heptyl-undecane-1-ol | | | | | | 14.8 | |
| Ethylene oxide | 9.7 | 5 | 17 | | | 1.45 | |
| Propylene oxide | | | | | | | 8.7 |
| 1,2-butylene oxide | | | | 7.2 | | | |
| Styrene oxide | | | | | 13 | | |
| Potassium hydroxide | 3 | 1.2 | 1.3 | 0.6 | 0.6 | 0.3 | 1.5 |
| Reaction temperature (° C.) | 90 | 85 | 85 | 65–70 | 110 | 85 | 95 |
| Reaction time (hours) | 20.5 | 18 | 18 | 22 | 8 | 20 | 19 |
| Boiling range of product (° C./mm. Hg) | 72–120/0.3 | 72–84/0.4 | 66–112/11 | 72–77/0.15 | 108–112/0.13 | (1) | 78–86/0.35 |

[1] M.P., 37–39° C.

TABLE II

| Monomer No. | Parts | | | | | | | |
|---|---|---|---|---|---|---|---|---|
| | 11 | 12 | 13 | 14 | 15 | 16 | 17 | 18 |
| Ethylene glycol, mono (α,α-dihydroperfluorooctyl) ether (prepared in Ex. 1) | 95.3 | | | 30 | | | | |
| Diethylene glycol, mono (α,α-dihydroperfluorooctyl) ether (prepared in Ex. 1) | | 71.7 | | | | | | |
| Ethylene glycol, mono (1,1,7-trihydroperfluoro heptyl) ether (Intermediate #2) | | | 37 | | | | | |
| Ethylene glycol, mono (α,α-dihydroperfluoro butyl) ether (Intermediate #4) | | | | 14.92 | | | | |
| Diethylene glycol, mono (α,α-dihydroperfluoro butyl) ether (Intermediate #4) | | | | 21.76 | | | | |
| Triethylene glycol, mono (α,α-dihydroperfluoro butyl) ether (Intermediate #4) | | | | 2.80 | | | | |
| 1-methyl-ethylene glycol, mono-( ,α-dihydroperfluorooctyl)ether (Intermediate #8) | | | | | | 25 | | |
| Ethylene glycol, mono ([11-perfluoro heptyl] undecyl) ether (Intermediate #7) | | | | | | | | 12.6 |
| 1-phenyl-ethylene glycol, mono-(α,α-dihydroperfluorooctyl) ether (Intermediate #6) | | | | | | | 25.9 | |
| 1-ethyl-ethylene glycol, mono-(α,α-dihydroperfluorooctyl) ether (Intermediate #5) | | | | | 20 | | | |
| Methacrylyl chloride | 45 | | | | 5.4 | | 6.3 | |
| Glacial acrylic acid | | 14 | 7.2 | 21 | | 8.6 | | 3.1 |
| Toluene | | 50 | | 75 | | 35 | | 30 |
| Benzene | | | 50 | | 25 | | 45 | |
| Benzene sulfonic acid | | 0.5 | | 0.6 | | 0.3 | | 0.13 |
| Methyl ether hydroquinone | 1.5 | | | | 0.03 | 0.5 | 0.007 | 0.13 |
| Hydroquinone | | 0.5 | 0.3 | 0.6 | | | | |
| Triethyl amine | 46 | | | | 5.1 | | 7.6 | |
| Diethyl ether | 178 | | | | | | | |
| Percent yield | 98 | 93 | 86 | 88 | 93.4 | 67 | 93.2 | 90 |
| Boiling point (° C./mm. Hg) | 80–110/0.02 | 80–90/0.3 | 85–90/0.2 | 68–104/12 | 105–112/0.28 | 65–77/0.07 | 133–135/0.45 | (¹) |

¹ M.P. 28–35° C.

TABLE III

| Polymer No. | Parts | | | | |
|---|---|---|---|---|---|
| | 21 | 22 | 23 | 24 | 25 |
| Ethylene glycol, mono-(1,1,7-trihydroperfluoroheptyl) ether acrylate (Monomer #12) | 15 | | | | |
| Ethylene glycol, mono-((α,α,dihydroperfluorooctyl) ether acrylate (Monomer #13) | | 18 | 10 | | |
| Ethylene glycol, mono-(α,α-dihydroperfluorooctyl) ether methacrylate Monomer #11) | | | | 10 | |
| 1-ethyl-ethylene glycol, mono-(α,α-dihydroperfluorooctyl) ether methacrylate (Monomer #15) | | | | | 16 |
| Methyl methacrylate | | | | | 10 |
| 2-ethyl hexyl acrylate | | | | 1.8 | |
| N-methylol acrylamide | | | 0.4 | 0.23 | |
| Acetone | | | | 10.3 | 20 |
| Benzene | | | 11.8 | | |
| Methyl alcohol | | 5 | | | |
| Iso-propyl alcohol | 15 | | | | |
| α,α'-azobisisobutyronitrile | 0.02 | 0.02 | 0.06 | 0.03 | 0.13 |
| Reaction temperature (° C.) | 65 | 65 | 65 | 58 | 58 |
| Reaction time (hours) | 8 | 7 | 18 | 7 | 5 |
| Conversion to polymer (percent) | 90 | 75 | 100 | 87.7 | 89 |

EXAMPLE V

This example illustrates the excellent water and oil repellent properties exhibited by substrates which have been treated with the novel fluoro acrylate copolymers of this invention.

In order to demonstrate the excellent water and oil repellent characteristics of the novel copolymers of this invention, the following testing procedures were employed. In each instance, the cotton print cloth that was used as the textile sample was treated by means of a padding technique wherein the sample was passed through a 1:1 isopropanol:methyl ethyl ketone solution of the selected copolymer, squeezed through a nip, heated at a low temperature in order to evaporate the solvent and thereafter heated at a temperature of 150° C. for a period of 5 minutes in order to cure the thus treated fabric.

Oil repellency: The oil repellency of the treated cotton fabrics was measured by use of the "3M Oil Repellency Test"; the latter procedure being fully described on page 323 of the April 1962 issue of the Textile Research Journal. In this procedure, an 8" x 10" swatch of the treated cotton, which had been conditioned at a temperature of 70° F. (21° C.) and a relative humidity of 65% for a period of 4 hours, was securely fastened to a 5" hoop in order to provide a smooth wrinkle-free surface. Single drops of testing oils, which comprised varying mixtures of mineral oil and n-heptane were gently placed upon the fabric and after a three minute period, the fabric was visually studied in order to observe the extent of wetting and penetration. An oil repellency rating, as defined in the following table, was then assigned to each fabric; the latter rating corresponding to the composition of the particular oil mixture which contained the highest percentage of heptane and which did not penetrate or wet the fabric.

| Oil repellency rating | Volume percent | |
|---|---|---|
| | Mineral oil | Heptane |
| 120 | 30 | 70 |
| 110 | 40 | 60 |
| 100 | 50 | 50 |
| 90 | 60 | 40 |
| 80 | 70 | 30 |
| 70 | 80 | 20 |
| 50 | ¹ 100 | 0 |

¹ No resistance to mineral oil.

It is to be noted that ratings of 70 and above are indicative of effective oil repellency.

Water repellency: The water repellency of the treated cotton fabrics was measured by use of the "Standard Spray Test" of the American Association of Textile Chemists and Colorists—AATCC No. 22–1964. In this procedure, the cotton samples which were used were prepared according to the method described, hereinabove, in the "Oil Repellency Test." The swatch was then securely fastened to a 6" hoop so that it presented a smooth wrinkle-free surface. The test sample was positioned at a 45° angle with its mid-point directly opposite a spray nozzle so that the center of the spray pattern from the nozzle was, accordingly, aligned with the mid-point of the swatch. Thereupon, 250 ml. of distilled water were sprayed onto the sample over a period of 25 to 30 seconds. The wet pattern which formed on the surface of the test sample was compared with a series of rated standard wet patterns. Each test sample was then assigned the rating of the standard pattern which most closely approximated the pattern on the test sample. The standard patterns were rated according to the following scheme:

100—no sticking or wetting of upper surface
90—slight random sticking and wetting of upper surface
80—wetting of upper surface at spray points
70—partial wetting of whole of upper surface 50—complete wetting of whole of upper surface
0—complete wetting of whole of upper and lower surfaces.

The results of these determinations are presented in the following table:

| Repellent (Polymer No.) | Percent of repellent based on weight of cotton fabric | Oil rating | Spray rating |
|---|---|---|---|
| Control (untreated cotton swatch) | | 0 | 0 |
| 22 | 1.5 | 110 | 70 |
| 23 | 1.5 | 90 | 70 |
| 24 | 1.5 | 110 | 70 |
| 25 | 1.5 | 70 | |

The results summarized above thus clearly show the excellent water and oil repellency exhibited by the novel fluoro acrylate polymers of this invention.

Summarizing, it is thus seen that this invention provides a novel class of fluoro acrylate and methacrylate esters which may be incorporated into a wide variety of copolymers; the resulting copolymers displaying excellent water, oil and soil repellency properties.

What is claimed is:

1. A composition selected from the group consisting of fluoroalkyl-alkoxyalkyl acrylate and methacrylate esters corresponding to the formula

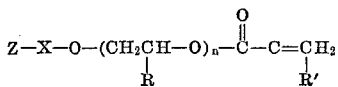

wherein

Z is a radical containing from 3 to 20 carbon atoms inclusive and is selected from the group consisting of straight and branched chain perfluoro alkyl radicals; perfluoro cyclo aliphatic radicals; and, straight and branched chain perfluoro alkyl and perfluoro cyclo aliphatic radicals wherein the perfluoro group is substituted with at least one atom selected from the group consisting of hydrogen, chlorine, bromine and iodine atoms;

X is a radical selected from the group consisting of straight and branched chain alkenylene and alkylene radicals containing from 1 to 20 carbon atoms;

R is selected from the group consisting of hydrogen, alkyl radicals containing from 1 to 20 carbon atoms, aromatic radicals, and cycloaliphatic radicals;

R' is selected from the group consisting of hydrogen and methyl radicals; and, $n$ is an integer having a value of from 1 to 10 inclusive.

2. A composition exhibiting water and oil repellency properties comprising a polymer of at least one ethylenically unsaturated monomer together with at least one monomeric composition selected from the group consisting of fluoroalkyl-alkoxyalkyl acrylate and methacrylate esters corresponding to the formula

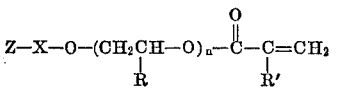

wherein

Z is a radical containing from 3 to 20 carbon atoms inclusive and is selected from the group consisting of straight and branched chain perfluoro alkyl radicals; perfluoro cyclo aliphatic radicals; and, straight and branched chain perfluoro alkyl and perfluoro cyclo aliphatic radicals wherein the perfluoro group is substituted with at least one atom selected from the group consisting of hydrogen, chlorine, bromine and iodine atoms;

X is a radical selected from the group consisting of straight and branched chain alkenylene and alkylene radicals containing from 1 to 20 carbon atoms;

R is selected from the group consisting of hydrogen, alkyl radicals containing from 1 to 20 carbon atoms, aromatic radicals, and cycloaliphatic radicals;

R' is selected from the group consisting of hydrogen and methyl radicals; and, $n$ is an integer having a value of from 1 to 10 inclusive.

3. The composition of claim 2, wherein said ethylenically unsaturated monomer is selected from the group consisting of styrene, alpha-methyl styrene, the acrylic, methacrylic and crotonic esters of aliphatic alcohols, acrylic acid, methacrylic acid, crotonic acid, isoprene, acrylamide, methacrylamide, N-methylol acrylamide, acrylonitrile, methacrylonitrile, butadiene, vinyl propionate, dibutyl fumarate, dibutyl maleate, diallyl phthalate, vinylidene chloride, vinyl chloride, vinyl fluoride, vinyl acetate, ethylene and propylene.

4. A process for preparing polymers which are capable of imparting water and oil repellency to solid substrates, said process comprising the step of heating at least one ethylenically unsaturated monomer, in the presence of a free radical initiator, together with at least one monomeric composition selected from the group consisting of fluoroalkyl-alkoxyalkyl acrylate and methacrylate esters corresponding to the formula

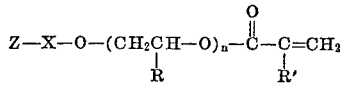

wherein

Z is a radical containing from 3 to 20 carbon atoms inclusive and is selected from the group consisting of straight and branched chain perfluoro alkyl radicals; perfluoro cyclo aliphatic radicals; and, straight and branched chain perfluoro alkyl and perfluoro cyclo aliphatic radicals wherein the perfluoro group is substituted with at least one atom selected from the group consisting of hydrogen, chlorine, bromine and iodine atoms;

X is a radical selected from the group consisting of straight and branched chain alkenylene and alkylene radicals containing from 1 to 20 carbon atoms;

R is selected from the group consisting of hydrogen, alkyl radicals containing from 1 to 20 carbon atoms, aromatic radicals, and cycloaliphatic radicals;

R' is selected from the group consisting of hydrogen and methyl radicals; and, $n$ is an integer having a value of from 1 to 10 inclusive.

5. The process of claim 4, wherein said ethylenically unsaturated monomer is selected from the group consisting of styrene, alpha-methyl styrene, the acrylic, methacrylic and crotonic esters of aliphatic alcohols, acrylic acid, methacrylic acid, crotonic acid, isoprene, acrylamide, methacrylamide, N-methylol acrylamide, acrylonitrile, methacrylonitrile, butadiene, vinyl propionate, dibutyl fumarate, dibutyl maleate, diallyl phthalate, vinylidene chloride, vinyl chloride, vinyl fluoride, vinyl acetate, ethylene and propylene.

6. A solid substrate exhibiting water and oil repellency to which has been applied on at least one surface thereof a polymer of at least one ethylenically unsaturated monomer together with at least one monomeric composition selected from the group consisting of fluoroalkyl-alkoxyalkyl acrylate and methacrylate esters corresponding to the formula

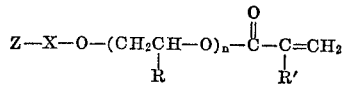

wherein

Z is a radical containing from 3 to 20 carbon atoms inclusive and is selected from the group consisting of straight and branched chain perfluoro alkyl radicals; perfluoro cyclo aliphatic radicals; and, straight and branched chain perfluoro alkyl and perfluoro cyclo aliphatic radicals wherein the perfluoro group is substituted with at least one atom selected from the group consisting of hydrogen, chlorine, bromine and iodine atoms;

X is a radical selected from the group consisting of straight and branched chain alkenylene and alkylene radicals containing from 1 to 20 carbon atoms;

R is selected from the group consisting of hydrogen, alkyl radicals containing from 1 to 20 carbon atoms, aromatic radicals, and cycloaliphatic radicals;

R' is selected from the group consisting of hydrogen and methyl radicals; and, $n$ is an integer having a value of from 1 to 10 inclusive.

7. The solid substrate of claim 6, wherein said ethylenically unsaturated monomer is selected from the group consisting of styrene, alpha-methyl styrene, the acrylic, methacrylic and crotonic esters of aliphatic alcohols, acrylic acid, methacrylic acid, crotonic acid, isoprene, acrylamide, methacrylamide, N-methylol acrylamide, acrylonitrile, methacrylonitrile, butadiene, vinyl propionate, dibutyl fumarate, dibutyl maleate, diallyl phthalate, vinylidene chloride, vinyl chloride, vinyl fluoride, vinyl acetate, ethylene and propylene.

8. The solid substrate of claim 6 to which has been applied at least 0.1% of said polymer, based on the weight of said substrate.

9. A process for imparting water and oil repellency to solid substrates which comprises applying to said substrate an organic solvent solution of a polymer of at least one ethylenically unsaturated monomer together with at least one monomeric composition selected from the group consisting of fluoroalkyl-alkoxyalkyl acrylate and methacrylate esters corresponding to the formula

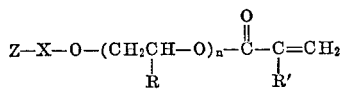

wherein

Z is a radical containing from 3 to 20 carbon atoms inclusive and is selected from the group consisting of straight and branched chain perfluoro alkyl radicals; perfluoro cyclo aliphatic radicals; and, straight and branched chain perfluoro alkyl and perfluoro cyclo aliphatic radicals wherein the perfluoro group is substituted with at least one atom selected from the group consisting of hydrogen, chlorine, bromine and iodine atoms;

X is a radical selected from the group consisting of straight and branched chain alkenylene and alkylene radicals containing from 1 to 20 carbon atoms;

R is selected from the group consisting of hydrogen, alkyl radicals containing from 1 to 20 carbon atoms, aromatic radicals, and cycloaliphatic radicals;

R' is selected from the group consisting of hydrogen and methyl radicals; and, $n$ is an integer having a value of from 1 to 10 inclusive.

10. The process of claim 9, wherein said ethylenically unsaturated monomer is selected from the group consisting of styrene, alpha-methyl styrene, the acrylic, methacrylic and crotonic esters of aliphatic alcohols, acrylic acid, methacrylic acid, crotonic acid, isoprene, acrylamide, methacrylamide, N-methylol acrylamide, acrylonitrile, methacrylonitrile, butadiene, vinyl propionate, dibutyl fumarate, dibutyl maleate, diallyl phthalate, vinylidene chloride, vinyl chloride, vinyl fluoride, vinyl acetate, ethylene and propylene.

11. The process of claim 9 in which at least 0.1% of said polymer, based on the weight of the substrate, is applied to said substrate.

12. A composition comprising a homopolymer of a monomeric composition selected from the group consisting of fluoroalkylalkoxyalkyl acrylate and methacrylate esters correspond to the formula

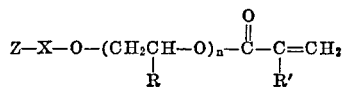

wherein

Z is a radical containing from 3 to 20 carbon atoms inclusive and is selected from the group consisting of straight and branched chain perfluoro alkyl radicals; perfluoro cyclo aliphatic radicals; and, straight and branched chain perfluoro alkyl and perfluoro cyclo aliphatic radicals wherein the perfluoro group is substituted with at least one atom selected from the group consisting of hydrogen, chlorine, bromine and iodine atoms;

X is a radical selected from the group consisting of straight and branched chain alkylenylene and alkylene radicals containing from 1 to 20 carbon atoms;

R is selected from the group consisting of hydrogen, alkyl radicals containing from 1 to 20 carbon atoms, aromatic radicals, and cycloaliphatic radicals;

R' is selected from the group consisting of hydrogen and methyl radicals; and, $n$ is an integer having a value of from 1 to 10 inclusive.

References Cited

UNITED STATES PATENTS

| | | | |
|---|---|---|---|
| 3,527,742 | 9/1970 | Pittman et al | 260—89.5 |
| 3,394,115 | 7/1968 | Sorkin | 260—89.5 |
| 3,547,861 | 12/1970 | Anello et al. | 260—89.5 |
| 3,498,958 | 3/1970 | Ray-Chaudhuri et al. | 260—78.5 |

JOSEPH L. SCHOFER, Primary Examiner

J. KIGHT III, Assistant Examiner

U.S. Cl. X.R.

117—124 E, 126 AB, 127, 132 CF, 138.8 UF, 139.5 A, 161 UC; 252—8.57, 8.9; 260—29.6 F, 32.8 R, 33.4 R, 80.81, 83.5, 85.5 ES, 85.7, 86.1 R, 86.3, 86.7, 89.5 H, 486 H

Notice of Adverse Decision in Interference

In Interference No. 98,869 involving Patent No. 3,660,360, D. K. Ray-Chaudhuri and C. P. Iovine, WATER- AND OIL REPELLENCY AGENTS, final judgment adverse to the patentees was rendered Apr. 6, 1976, as to claims 1, 2 and 12.

[*Official Gazette June 22, 1976.*]

Disclaimer 3,660,360.—*Dilip K. Ray-Chaudhuri* and *Carmine P. Iovine*, Somerset, N.J. WATER AND OIL REPELLENCY AGENTS. Patent dated May 2, 1972. Disclaimer filed Sept. 28, 1976, by the assignee, *National Starch and Chemical Corporation*.

Hereby enters this disclaimer to claims 1, 2 and 12 of said patent.

[*Official Gazette January 11, 1977.*]